L. HOFFMAN.
PRESSING MACHINE.
APPLICATION FILED AUG. 28, 1918.
Reissued Feb. 11, 1919.
14,590.
2 SHEETS—SHEET 1.
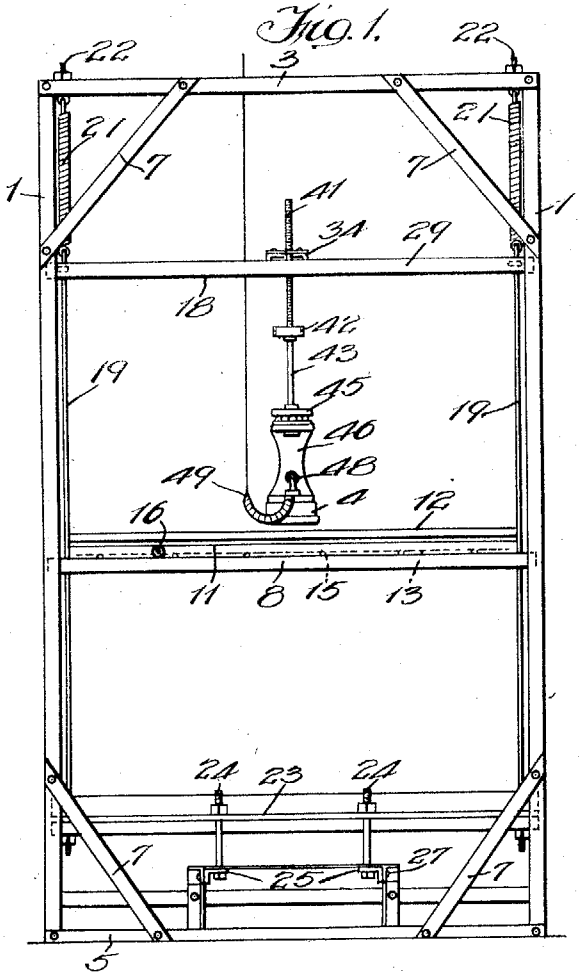
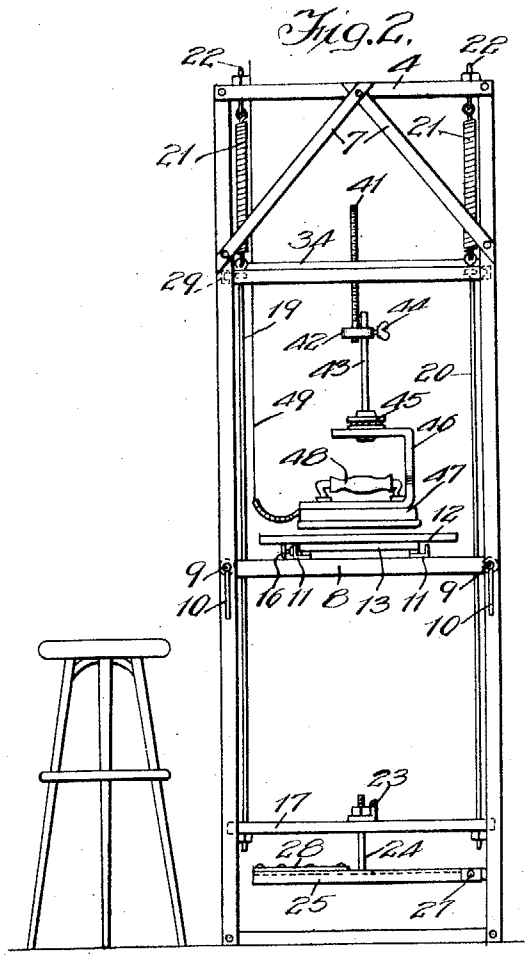
Witnesses:
W. L. Kilroy
Harry R. L. White.
Inventor:
Louis Hoffman
By Barnett & Truman
Attys.

L. HOFFMAN.
PRESSING MACHINE.
APPLICATION FILED AUG. 28, 1918.
Reissued Feb. 11, 1919.
14,590.
2 SHEETS—SHEET 2.
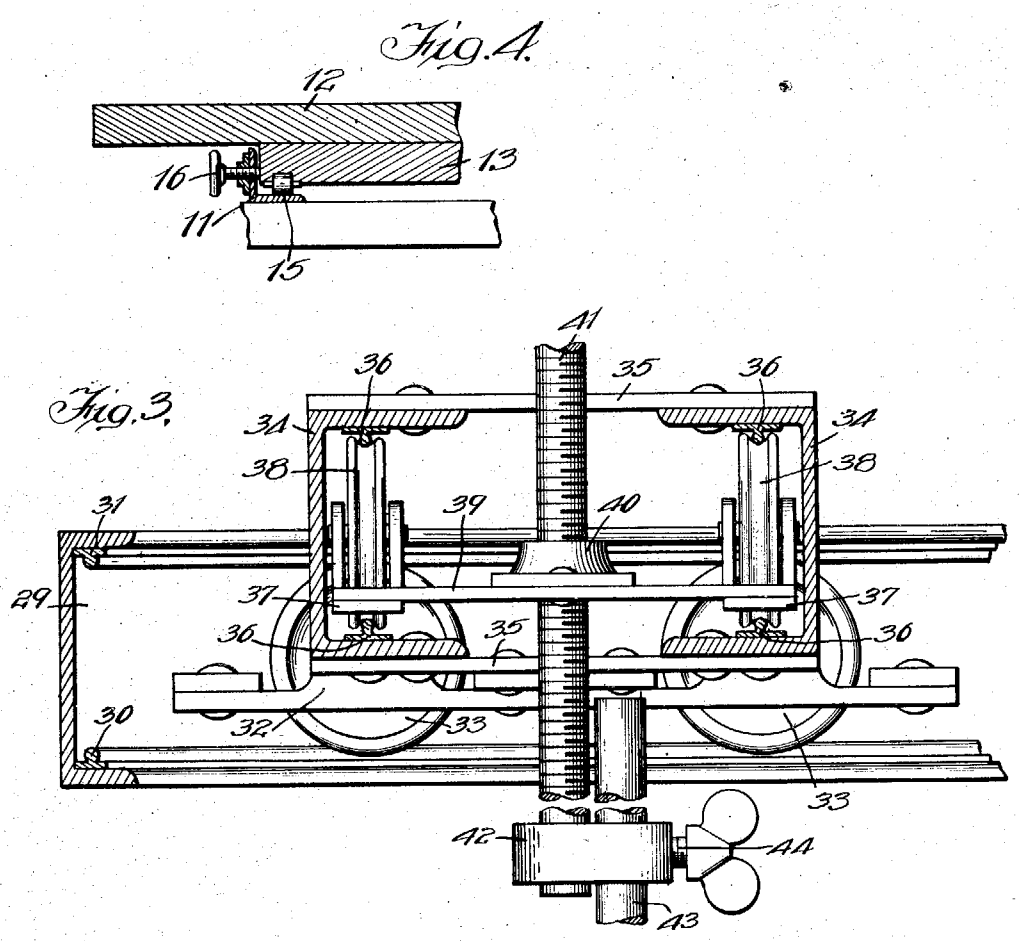
Witnesses:
W. F. Kilroy
Harry R. White
Inventor:
Louis Hoffman
By Barnett & Pillman
Attys.

UNITED STATES PATENT OFFICE.

LOUIS HOFFMAN, OF DULUTH, MINNESOTA, ASSIGNOR TO F. A. PATRICK & COMPANY, OF DULUTH, MINNESOTA, A CORPORATION OF MAINE.

PRESSING-MACHINE.

14,590. Specification of Reissued Letters Patent. Reissued Feb. 11, 1919.

Original No. 1,196,112, dated August 29, 1916, Serial No. 91,307, filed April 15, 1916. Application for reissue filed August 28, 1918. Serial No. 251,863.

*To all whom it may concern:*

Be it known that I, LOUIS HOFFMAN, a citizen of the United States, residing at Duluth, in the county of St. Louis and State of Minnesota, have invented certain new and useful Improvements in Pressing-Machines, of which the following is a specification, reference being had therein to the accompanying drawing.

This invention consists of certain improvements in ironing machines and relates particularly to a manually operated ironing machine such as is used for pressing clothes and the like.

The object is to provide a machine of this character which while being manually operated requires the least effort possible on the part of the operator to acquire the maximum efficiency of the machine.

Another object is to so construct a machine of this character that the operator may assume a sitting posture while in the act of using the machine.

Other objects and advantages will appear in the further description of the device.

In the accompanying drawings forming part of this application, and in which like reference characters indicate like parts, Figure 1 is a front elevation of my improved ironing machine.

Fig. 2 is a side elevation of the same.

Fig. 3 is a vertical cross sectional view of the traveling carriage partly in elevation, and Fig. 4 is a sectional view of one corner of the reciprocal table.

A rigid rectangular shaped fabricated frame construction is made of small metal angle bars and which comprises the front corner bars 1—1, rear corner bars 2—2, top bars 3 and 4, bottom bars 5 and 6, and various suitable angle braces 7, arranged as considered desirable for a suitable supporting frame. Within this frame is vertically adjustably mounted a platform or table supporting frame 8, also composed of angle bars, firmly united and which is fixed to the corner angles 1—1 and 2—2 of the supporting frame by means of suitable bolts 9 and which bolts engage vertically elongated openings 10 within the corners of the supporting frame whereby when the bolts 9 are slackened, the frame 8 may be raised or lowered to suit the requirements of the operator or the particular kind of work in hand. Two angle bars 11—11 are fixed upon the frame 8 facing each other and spaced apart to act as a track for the reception of the ironing table or board which is movable in the direction of its length, that is, laterally with respect to the operator, composed of two pieces of wood 12 and 13 firmly united, the latter being of a width to freely fit the space between the angle bars 11—11 and which member 13 has fixed upon the under face thereof and along its side edges, a series of small caster wheels 15 of any desired form and which portably support the table upon the angles 11—11. The upper member 12 of the table is considerably wider than the member 13 and projects beyond the edges of the latter, to form a suitable supporting surface for the work to be done. A hand operated locking screw 16 is threaded through the upstanding wall of the front one of the angle bars 11 to provide means for quickly holding the platform in any desired position longitudinally. However, any other form of locking device may be resorted to without departing from the spirit of the invention.

A vertically reciprocal frame is mounted within the supporting frame and guided within the corner angles 1—1 and 2—2 of said supporting frame. The lower member 17 of the reciprocal frame is composed of small angle bars and suspended from the upper member 18 of the reciprocal frame by means of vertical rods 19 and 20 in the four corners thereof. The upper member 18 is in turn resiliently supported from the upper end of the supporting frame by means of four spiral springs 21 suitably attached to the corners of the supporting frame by means of bolts 22. Thus the reciprocal frame, comprising the members 17 and 18 and rods 19 and 20, is resiliently supported, the rods 19 and 20 passing freely through suitable openings, not shown, in the corners of the adjustable frame 8, or free therefrom.

Fixed upon the member 17 of the reciprocal frame and centrally thereover in respect to a side elevation thereof, is an angle bar 23 from which is suspended by means of suitable bolts 24—24, the foot pivoted pedal comprising the angles 25—25, pivoted at 27—27 and the tread 28. By this arrangement it is evident that upon application of the foot of the operator to the tread 28, the reciprocal frame may be depressed and upon release of pressure from the foot of the operator, the frame will be returned to its normal position by the contracting action of the four spiral springs 21.

The front and rear sides of the member 18 of the reciprocal frame is composed of small channel bars 29—29, and within each of which channel bar is fixed two track rails 30 and 31, one upon the lower angle of the channel and the other upon the upper angle of the channel, forming a track for the carriage 32 mounted upon the wheels 33 and which wheels rest normally upon the rail 30 of the track, they being preferably flanged upon two sides in order to straddle the rail.

There are two carriages 32, one mounted within each channel bar 29, and they support between them a transverse traveling frame comprising the channel bars 34, 34 and the cross pieces 35, 35 which are rigidly united by suitable rivets. The channels 34 are identical to the channels 29 and have fixed therein rails 36 similar to rails 30 and 31 upon which are mounted carriages 37, supported upon wheels 38 similar to those within the channels 29. The carriages 37, 37 support between them a plate or platform 39 having a fixed screw threaded member 40 thereupon, in which the screw threaded stem 41 is mounted. The lower end of the stem 41 carries rigidly fixed thereto a hub member 42, which adjustably supports adjacent therewith the smooth stem 43, there being a suitable thumb set screw 44 within said hub 42 and designed to hold the stem 43 in any desired position within the hub. The stem 43 is pivotally connected at its lower end, preferably by means of a suitable ball bearing 45, to the strong back 46 which supports the iron 47, there being a handle 48 upon the iron for manipulating the same. The preferred form of iron used in the machine is one heated by electricity, and I have illustrated the electric connection thereto as at 49. The preferred vertical adjustment of the iron is such as to maintain it slightly above the level with the top of the ironing table so that goods to be ironed may be readily slipped thereunder and the only adjustment of the iron necessary being that of downward, which is accomplished by pressure of the foot upon the tread 28.

From the foregoing it is evident that the iron may be adjusted horizontally to any desired position within the side walls of the member 18 of the vertically reciprocal frame, and that the iron and ironing table are capable of wide extensive vertical adjustment to suit individual requirements.

Where a large garment or piece of cloth is being ironed, it may be more desirable for the operator to hold the iron in a comparatively fixed position and move the table back and forth, or the table can be moved from time to time between pressing operations so as to bring different parts of the garment successively before the presser. These movements of the table, and the locking of the table in fixed position, when necessary, can be readily accomplished with one hand while the iron is being manipulated horizontally with the other hand, and vertically by the feet. The presser may operate the machine while seated and need not change his position during any stage of the work.

It is to be understood that various modifications of construction and arrangement of parts may be resorted to without departing from the spirit of the invention.

Having thus described my invention, what I claim and desire to secure by Letters Patent, is:

1. An ironing machine of the character described, comprising a rectangular shaped supporting frame having four vertical corner posts, a second vertically reciprocal rectangular frame carried within the supporting frame, guided at its four corners by the corner posts of the supporting frame, and suspended from the upper end of the supporting frame, means at the lower end of the supporting frame for depressing the reciprocal frame, an ironing table carried by the supporting frame and an iron suspended from the upper end of the reciprocating frame and designed to operate upon the table.

2. The combination with an ironing machine of the character described, having a supporting frame, a table and a vertically reciprocal frame carried by the supporting frame, the upper end of the reciprocal frame having opposite sides constructed of channel bars facing each other, a carriage within each channel bar, said carriages being coöperatively united by means of a cross frame having two channel bars facing each other and carried by the carriages, a carriage within each cross frame channel bar, said carriages supporting between them a depending pressing iron for operation upon an article placed upon the table.

3. In a pressing machine, the combination of a supporting frame, an ironing board and an iron, means for supporting the iron so so that it may be moved in all directions over the board, means adapted to be worked by the foot of the operator whereby the iron and board may be brought together and separated by a vertical movement of one of them, means for supporting the board comprising tracks and rollers for the same so that the board may be moved laterally with respect to the operator, and releasable means for holding the board against said lateral movement when desired.

4. In a pressing machine, the combination of a supporting frame, an ironing board and an iron, means for supporting the iron so that it may be moved in all directions over the board, means adapted to be worked by the foot of the operator whereby the iron and board may be brought together and separated by a vertical movement of one of them, and means for supporting the board comprising rollers and tracks for the same so that the board may be moved laterally with respect to the operator.

LOUIS HOFFMAN.